United States Patent
Rinnhofer et al.

(10) Patent No.: US 9,688,579 B2
(45) Date of Patent: Jun. 27, 2017

(54) ADMIXTURES AND ADMIXTURE FORMATION USED IN CONCRETE TECHNOLOGY

(71) Applicant: CEMEX RESEARCH GROUP AG, Bruegg-b-Biel (CH)

(72) Inventors: Reinhard Wolfgang Rinnhofer, Krieglach (AT); Jessica Chiaverini, Biel/Bienne (CH); Alessandro Russo, Biel/Bienne (CH); Michael Strahsberger, Krieglach (AT); Carsten Zanders, Worben (CH); Julien Chapelat, Muespach (FR)

(73) Assignee: CEMEX RESEARCH GROUP AG, Brügg Bei Biel (CH)

( * ) Notice: Subject to any disclaimer, the term of this patent is extended or adjusted under 35 U.S.C. 154(b) by 0 days.

(21) Appl. No.: 14/909,025

(22) PCT Filed: Aug. 1, 2014

(86) PCT No.: PCT/EP2014/066605
§ 371 (c)(1),
(2) Date: Jan. 29, 2016

(87) PCT Pub. No.: WO2015/014990
PCT Pub. Date: Feb. 5, 2015

(65) Prior Publication Data
US 2016/0168033 A1   Jun. 16, 2016

(30) Foreign Application Priority Data
Aug. 2, 2013   (WO) ................ PCT/EP2013/066296

(51) Int. Cl.
| C04B 24/26 | (2006.01) |
| C04B 28/28 | (2006.01) |
| C04B 28/02 | (2006.01) |
| C04B 40/00 | (2006.01) |

(52) U.S. Cl.
CPC .............. *C04B 28/28* (2013.01); *C04B 28/02* (2013.01); *C04B 40/0039* (2013.01)

(58) Field of Classification Search
CPC ....................................................... C04B 28/28
USPC ............................................................ 524/5
See application file for complete search history.

(56) References Cited

U.S. PATENT DOCUMENTS

| 2012/0316267 A1 | 12/2012 | Jacquet et al. |
| 2014/0039098 A1 | 2/2014 | Chougrani et al. |

FOREIGN PATENT DOCUMENTS

| EP | 1799624 | 6/2007 | |
| EP | 1015398 | 5/2010 | |
| FR | 2776285 | 9/1999 | |
| FR | 2776285 A1 * | 9/1999 | ........... C04B 24/243 |
| WO | WO2006133762 | 12/2006 | |
| WO | WO2010005117 | 1/2010 | |
| WO | WO2012140235 | 10/2012 | |

OTHER PUBLICATIONS

International Search Report for PCT/EP2014/066605 Oct. 21, 2014.
International Search Report for PCT/EP2013/066296 dated Apr. 29, 2014.

* cited by examiner

*Primary Examiner* — Hui Chin
(74) *Attorney, Agent, or Firm* — Workman Nydegger

(57) ABSTRACT

A concrete mix design having a slump class from S1 to S5 or a flow class from F1 to F6 and a workability retention between 10 minutes and 120 minutes, comprising
from 150 to 600 kg of cement per cubic meter of concrete,
aggregates selected from the group consisting of sand, fine aggregates, coarse aggregates or combinations thereof containing between 0.5 wt. % and 75 wt. % of phyllosilicates, is characterized in that
the concrete mix design includes an admixture system 1 which is based on 100% polycarboxylate ether based copolymer (PCE),
the admixture system 1 comprising at least one component B1 being a PCE copolymer.

20 Claims, No Drawings

ADMIXTURES AND ADMIXTURE FORMATION USED IN CONCRETE TECHNOLOGY

FIELD OF THE INVENTION

The present invention relates to the use of admixtures used in concrete technology, to enable the use of sand aggregates, fine and coarse aggregates that contain phyllosilicates by inerting or strongly reducing the adsorption effect produced by the phyllosilicates and provide robust concrete formulations for a vast range of applications and workability retention. The invention further relates to the use of admixtures in concrete composition as well as to concrete compositions comprising such admixtures.

BACKGROUND OF THE INVENTION

Conventionally, concrete composition contain a cementitious material, for instance cement based on Ordinary Portland Cement, mineral additions, inorganic additions, water, sand aggregate, fine and coarse aggregates as well a various admixtures to reduce the water demand (water reducers or dispersants), superplasticizers, viscosity modifiers, accelerators, air entrainers, and additives like fillers, fibers, etc.

Impurities contained in the mineral, in the sand and aggregates (for instance various traces of clay like smectite, montmorillonite, koalinite, illite, etc.) may not only strongly affect the availability of water in the fresh concrete but will also influence the efficiency of the admixtures that will be quickly adsorbed by the impurities, thus limiting their core effect in the concrete. As a result, concrete mix designs are highly unstable and lack robustness so fresh and final properties are dramatically impacted. Furthermore, overdosing the admixtures to compensate for the adsorbed part will produce unexpected degradation of the mix designs in term of stability (segregation between cement paste and aggregates) or mechanical properties (intermediate and final strength).

Such a mechanism is also observed using aggregates from various geological sources. Rocks like schist, micaschist gneiss, shale, slate may phyllosilicates like kaolinite, talc, micas, serpentines, chlorite, smectites, etc.

Moreover, phyllosilicates are known to degrade into clay minerals (illite-smectite clays from muscovite and paragonite mica) and in certain conditions can release the interlayer cations leading to increased interactions.

The main properties that influence the reactivity are typically
  Particle dimensions: specific surface, shape
  Superficial charge (quantity of charge in the surface)
  Cationic exchange capacity
  Structure interlayer: type of cation, dimension of interlayer EP 1 799 624 B1 describes the use of cationic polymers with high level of charge to inert the negative effect of clay traces in sand used in concrete formulation. The use of such polymers in real concrete mix designs is, however, not described and limited and no information are available on the interaction with concrete technology admixtures like superplascizers, retardants or workability extension admixtures. Data are available for workability retention on mortar tests. Tests are limited to clay in sand, not exceeding 1% (m/m) of the sand and the presence of layered material in the aggregates is not mentioned.

EP 1 015 398 describes the combination of a cationic polymer together with a comb-type polymer (plasticizer), tested on mortar samples. A cationic polymer as in EP 1 799 624 B1 is used to limit or inhibit the effect of impurities on the depletion of water and plastizing admixture, thus obtaining acceptable workability with acceptable comb-polymer dosages. No results are provided concerning the workability retention (e.g. the capacity to maintain the rheological, or the slump/spread properties) obtained after mixing over a significant period of time (40 minutes to some hours), this enabling transportation with no degradation of the properties of the concrete to be placed.

The use of cationic polymers in concrete presents some serious drawbacks. The most important problem is connected with the fact that these cationic polymers contain chloride that is not recommended in concrete applications due to the corrosion of the reinforcement rebars. Also, these substances are not widely produced industrially and the supply may be problematic.

Finally, the technologies described in the prior art cannot always be used directly in the concrete mix designs as a normal admixture, but require a pre-processing of the contaminated sand aggregates or aggregates prior to their utilization in concrete mixes.

SUMMARY OF THE INVENTION

Hence, it is an object of the present invention to overcome the mentioned problems that occur in the prior art. The present invention aims to avoid the use of cationic polymers to inert the adsorption due to clays or layered minerals while still enabling the use of critical materials having high impurities contents of the type describe above. Accordingly, it is an object of the present invention to provide for the design of robust concrete formulation in fresh (placing, setting workability retention, stability—absence of segregation) and hardened (strength development, final strength, required durability properties, homogeneity) state.

This object is solved by the use of polycarboxylate ether based copolymer (PCE) as described in the independent claims.

Hence, the invention relates to a an admixture system based 100% on PCE, for use in concrete technology, using sand aggregates and aggregates containing over 0.05 wt. % of phyllosilicates, the PCE comprising at least one polycarboxylate ether based copolymer (PCE). A phyllosilicate content of less than 0.05% wt % (with respect to sand and aggregates) is deemed not to substantially affect the flow properties and dosages in conventional plasticizers.

In one embodiment a concrete mix design having a slump class from S1 to S5 or a flow class from F1 to F6 and a workability retention between 10 minutes and 120 minutes, comprising
  from 150 to 600 kg of cement per cubic meter of concrete,
  aggregates selected from the group consisting of sand, fine aggregates, coarse aggregates or combinations thereof containing between 0.5 wt. % and 75 wt. % of phyllosilicates, is characterized in that
  the concrete mix design includes an admixture system 1 which is based on 100% polycarboxylate ether based copolymer (PCE),
  the admixture system 1 comprising at least one component B1 being a PCE copolymer
    (i) having its negative charge temporarily blocked,
    (ii) having an esterification degree of between 5%-50%,
    (iii) with polyoxyalkylene side chains with 750 to 8000 Da, (iv) with a blocking of the carboxylic acids of 0.1 to 90 mole % units,
(v) the backbone of the PCE B1 consisting of carboxylic acids, salt thereof and dicarboxylic acid, anhydride and/or salts thereof,
(vi) the total molecular weight of PCE B1 being located between 10,000 and 1,000,000; and
further comprising at least a second PCE PCE B1 is described in reference WO2006/133762.

Slump class and flow class are in accordance with European Standard EN 206-1:2000.

The terms "blocked" and "masked" are used synonymously throughout this specification.

In a preferred embodiment the blocking of the carboxylic acids is of 45 to 90 mole % units, In one embodiment the second PCE copolymer of the admixture system 1 in the concrete mix design comprises component A1 and component A2.

In one embodiment the second PCE copolymer of the admixture system 1 in the concrete mix design comprises component A1, characterized by
an esterification degree of between 5% and 50%,
polyoxyalkylene side chains with 750 to 8000 Da and
the backbone of the PCE A1 consisting of carboxylic acids, salt thereof and dicarboxylic acid, anhydride and/or salts thereof,
the copolymer A1, having a total molecular weight between 15,000 and 1,000,000 Da.

In further embodiment the second PCE copolymer of the admixture system 1 in the concrete mix design comprises a component A2, characterized by
an esterification degree of between 5% and 20%,
polyoxyalkylene side chains with approximately 5000 Da,
blocking of the carboxylic acids of between 25 to 55 mole % units,
the PCE A2 backbone consisting of methacrylic acids and salts thereof with a total molecular weight of about 50,000 Da,
and the PCE B1 being characterized by a blocking of its carboxylic above 55 mole % units.

In various embodiments, the PCE system 1 is composed of mixes of components A1 and A2, B1 and A1 or B2 and A2.

In one embodiment the content of component A1 of admixture system 1 is between 0.5 to 50 wt. %. In such an embodiment it is preferred that the content of component B1 of admixture system 1 is >=50 wt. %.

In one embodiment the content of component A2 of admixture system 1 is between 0.5 to 55 wt. %. In such an embodiment it is preferred that the content of component B1 of admixture system 1 is >=45 wt. %.

Preferably the ratio A1/B1 is between 0.05 to 1 and the ratio A2/B1 is between 0.05 to 1.2.

The dosage range of system 1 preferably ranges between 0.002 wt. % to 0.2 wt. % of active solid content with respect to the aggregates containing phyllosilicates, more preferably the dosage range of system 1 ranges between 0.002 wt. % to 0.11 wt. % of active solid content with respect to the aggregates containing phyllosilicates.

The dosage range of system 2 preferably ranges between 0.03-0.75% wt. of active solid content (ASC) with respect to the cement.

In another embodiment of the admixture system 1 also contains one additional copolymer having its negative charge temporarily masked (component B1), superplasticizer having a low to high esterification degree (5%-50%), with short to long EO/PO side chains (750 to 8000 Da) and with a masking of the carboxylic acids of 0.1 to 90 mole % units consisting a salt thereof or anhydride thereof. The total molecular weight between 10,000 and 1,000,000. Such polymer is typically described in reference WO 2006/133762.

In another embodiment of the admixture system 1 the component A1 may be replaced by a component A2 that is an alternative to A1 and has its negative charges masked (0.1 to 55 mole % units).

The invention further concerns a concrete composition, comprising a binder, an aggregate and an admixture, wherein the aggregate contains phyllosilicates, wherein the admixture comprises a polycarboxylate ether based copolymer.

Other advantages will be described further, like avoiding having to process sand or aggregates with special chemicals before using them, limiting the number of admixtures formulation to use during mixing operations or having a single liquid admixture to dose for various concrete mix designed, simplifying the concrete manufacturing process.

The present invention intends to overcome these problems by using a technical solution that is based on polycarboxylate ether based copolymer (PCE) thus avoiding the use of cationic polymers. The invention is related to the use of aggregates (sand, fines and coarse) containing phyllosilicates, typically found in rocks like schists, micaschists, gneiss, shale, mica containing rocks, clay containing sediments in concrete mix designs, using a first admixture system that is based on PCE technology, while providing concrete mix designs that have important workability retention (over 10 minutes preferably 30 minutes preferably over 45 minutes, preferably over 70 minutes and preferably over 80 minutes), without affecting neither the strength development of the concrete mixes, nor the stability of the fresh concrete (absence of significant segregation).

According to one embodiment a second admixture system 2, designed to contribute to the reaching the initial consistency or slump within the range S1-S5, any flow category or both by using plasticizers/superplasticizers, is added to the admixture system 1.

The further plasticizers/superplasticizers of the system 2 may be selected from the group consisting of PCE, naphtalenes sulfonates, lignosulfonates or combinations thereof.

DESCRIPTION OF THE INVENTION

In order to better understand the present invention, some definitions are presented hereafter.

Hydraulic binder Material with cementing properties that sets and hardens due to hydration even under water. Hydraulic binders produce calcium silicate hydrates also known as CSH.

Cement Binder that sets and hardens and bring materials together. The most common cement is the ordinary Portland cement (OPC) and a series of Portland cements blended with other cementitious materials.

Ordinary Portland cement Hydraulic cement made from grinding clinker with gypsum. Portland cement contains calcium silicate, calcium aluminate and calcium ferroaluminate phases. These mineral phases react with water to produce strength.

Mineral Addition Mineral admixture (including the following powders: silica fume, fly ash, slags) added to concrete to enhance fresh properties, compressive strength development and improve durability.

Silica fume Source of amorphous silicon obtained as a byproduct of the silicon and ferrosilicon alloy production. Also know as microsilica.

Fibers Material used to increase concrete's structural performance. Fibers include: steel fibers, glass fibers, synthetic fibers and natural fibers.

Alumino silicate-by-product (Fly Ash-bottom ash) Alkali reactive binder components that together with the activator form the cementitious paste. These are minerals rich in alumina and silica in—both, amorphous and crystalline structure.

Natural Pozzolan Aluminosilicate material of volcanic origin that reacts with calcium hydroxide to produce calcium silicate hydrates or CSH as known in Portland cement hydration.

filler inert A material that does alter physical properties of concrete but does not take place in hydration reaction.

Admixture raw material Chemical component in an admixture formulation system of one main chemical polymer Admixture chemical admixtures used to modify or improve concrete's properties in fresh and hardened state. These could be air entrainers, water reducers, set retarders, superplasticizers and others.

PCE PCE are Polycarboxylic Acid Co-Polymers used as a class of cement and concrete admixtures, and are comb type polymers that are based on: a polymer backbone made of acrylic, methacrylic, maleic acid, and related monomers, which is grafted with polyoxyalkylene side-chain such as EO and/or PO. The grafting could be, but is not limited to, ester, ether, amide or imide.

Initial dispersant Initial dispersant is a chemical admixtures used in hydraulic cement compositions such as Portland cement concrete, part of the plasticizer and superplasticizer family, which allow a good dispersion of cement particles during the initial hydration stage.

Superplasticizers Superplasticizer relates to a class of chemical admixture used in hydraulic cement compositions such as Portland cement concrete having the ability to highly reduce the water demand while maintaining a good dispersion of cement particles. In particular, superplasticizers avoid particle aggregation and improve the rheological properties and workability of cement and concrete at the different stage of the hydration reaction.

Concrete Concrete is primarily a combination of hydraulic binder, sand, fine and/or coarse aggregates, water. Admixture can also be added to provide specific properties such as flow, lower water content, acceleration . . .

Pourable construction materials A material is consider as pourable as soon as its fluidity (with our without vibration) allow to full fill a formwork or to be collocate in a definite surface.

Construction materials Any materials that can be use to build construction element or structure. It includes concrete, masonries (bricks-blocks), stone, ICF . . .

Structural applications A construction material is consider as structural as soon as the compressive strength of the material is greater than 25 MPa Workability The workability of a material is measure with a slump test (table 1: slump)

Workability retention Is the capability of a mix to maintain its workability during the time. The total time required depend on the application and the transportation.

Strength development-setting/hardening The setting time start when the construction material change from plastic to rigid. In the rigid stage the material cannot be poured or moved anymore. After this phase the strength development corresponding to the hardening of the material Coarse Aggregates Manufactured, natural or recycled minerals with a particle size greater than 8 mm and a maximum size lower than 32 mm Fines Aggregates Manufactured, natural or recycled minerals with a particle size greater than 4 mm and a maximum size lower than 8 mm Sand aggregates Manufactured, natural or recycled minerals with a particle size lower than 4 mm Clay Material formed by particles lower than 2 microns composed mainly by clay minerals that has a plasticity property when put in contact with water Phyllosilicates Minerals with a flaky/platy habit with a layered structure formed by a combination of tetrahedral and octahedral sheets.

TABLE 1

Consistency of concrete (slump) with respect to EN (European) and FR (French) Norms

| EN 206-1 | | NF P 18-305 | |
|---|---|---|---|
| Consistency | slump [mm] | Consistency | slump [mm] |
| S1 | 10 to 40 | Stiff | 0 to 40 |
| S2 | 40 to 90 | Plastic | 50 to 90 |
| S3 | 100 to 150 | highly plastic | 100 to 150 |
| S4 | 16 to 210 | fluid | >160 |
| S5 | >220 | | |

TABLE 2

Consistency of concrete (flow) with respect to EN (European) Norms EN 206-1

| category | Flow [mm] |
|---|---|
| F1 | <340 |
| F2 | 350-410 |
| F3 | 420-480 |
| F4 | 490-550 |
| F5 | 560-620 |
| F6 | >630 |

The typical aggregates that are used to illustrate the results (here referred as AGG) are mainly Micaschist: metamorphic rocks of medium metamorphism with a structure of medium—large grain and flakes of mica in preferred sheet like orientation. The appearance is a rock with a foliation more or less accentuated. The petrographic analysis shows a composition of quartz (19% vol), plagioclase (14% vol), K-feldspar (3% vol), calcite (23% vol), mica (34% vol), kaolinit (3% vol) and chlorite (4% vol).

The XRD analysis shows the presence of 10-20 wt % of mica, 5-10 wt % of chlorite, 5-10 wt % of kaolinite and <5 wt % of smectite besides the presence of quartz, plagioclase, K-feldspar and calcite.

As a consequence, the weight % of phyllosilicates in the total aggregates (sand, fine and coarse AGGREGATES) is around 30-35 wt %.

The present invention is of course not limited to the aggregates described, it applies to all aggregates and sand having either phyllosilicates minerals or alteration products of silicates (sericite) or impurities like clay that represents more than 0.05 wt % of the total weight of sand and aggregates.

The mix design, may contain other admixtures and additive like air entrainer, defoamers, viscosity modifier, accelerators, retardant, fibers, etc.

6 aggregates size fractions from the same typical rock were used:
AGG 1: 0-4 mm (sand)
AGG 2: 4-8 mm (fine aggregates)
AGG 3: 8-16 mm (coarse aggregates)
AGG 4: 16-22 mm (coarse aggregates)
AGG 5: 4-16 mm (fine and coarse aggregates)
AGG 6: 16-32 mm (coarse aggregates)

Cement is a typical CEM II/A-M 42.5 N according to EN 197-1 and mineral additions is an alumina-silicate by product fly ash.

given as ratio of active solid (ASC) content in weight of the components A1, A2, B1 respectively.

The dosage of the system 2 is given in wt. % of active solid content (ASC) respect to the cement. The system 1 was used in a dosage of 0.02 to 0.1 wt. % with respect to the total aggregates containing phyllosilicates. The ratio between the component A1 and B1 was located between 0.25 to 0.82 with a quantity of B1 from 55% to 80 wt. % with respect to the total composition of the system 1. The admixtures used in the system 2 were used with a dosage from 0.1 to 0.4 wt. % of ASC respect to the cement.

TABLE 3

|  | MIX 1 | MIX 2 | MIX 3 | MIX 4 | MIX 5 | MIX 6 |
| --- | --- | --- | --- | --- | --- | --- |
| AGG 1: 0/4 mm (Kg/m3) | 805 | 942 | 873 | 873 | 873 | 873 |
| AGG 2: 4/8 mm (Kg/m3) | 185 | — | 132 | 132 | 132 | 132 |
| AGG 3: 8/16 mm (Kg/m3) | 445 | — | 451 | 451 | 451 | 451 |
| AGG 4: 16/22 mm (Kg/m3) | 426 | — | 432 | 432 | 432 | 432 |
| AGG 5: 4/16 mm (Kg/m3) | — | 599 | — | — | — | — |
| AGG 6: 16/32 mm (Kg/m3) | — | 412 | — | — | — | — |
| CEM II/A-M 42.5 N (Kg/m3) | 300 | 260 | 300 | 300 | 300 | 300 |
| Fly ash (Kg/m3) | 50 | 60 | 50 | 50 | 50 | 50 |
| water/binder ratio | 0.59 | 0.55 | 0.52 | 0.52 | 0.52 | 0.52 |
| SYSTEM 1 (% wt ASC respect to aggregates) | — | — | — | 0.04 | 0.08 | 0.04 |
| A1/B1 | — | — | — | 0.31 | 0.31 | 0.53 |
| SYSTEM 2 (% wt ASC respect to cement) | 0.36 | 0.25 | 0.30 | 0.15 | — | 0.15 |
| Parameters of fresh concrete |  |  |  |  |  |  |
| flow [mm] after 5 min | 680 | 500 | 550 | 595 | 540 | 580 |
| flow [mm] after 30 min | 580 | 435 | 380 | 605 | 515 | 595 |
| flow [mm] after 60 min | 480 | 360 | 320 | 600 | 500 | 550 |
| flow [mm] after 90 min | 420 | — | — | 560 | 480 | 410 |
| density [Kg/m$^3$] | 2365 | 2424 | 2448 | 2386 | 2454 | 2434 |
| Parameters of hardened concrete |  |  |  |  |  |  |
| compressive strenght [MPa]- 28 d | 30.20 | 32.40 | 38.00 | 36.00 | 39.80 | 38.45 |

Consistency of the concrete mixes is measured using the norms EN 12350-5: Fresh concrete measurement of the flow. Flow measurements are done after mixing at 5 minutes, 30 minutes, 60 minutes and 90 minutes.

The system 1 was composed by a component A1 made by a polymer that is characterized by a sufficient initial to medium workability PCE having a medium to high esterification degree (30-50%), short EO side-chain (1000 Da) and a copolymer of methacrylic acid backbone and a total molecular weight of 25,000.

The selected component B1 was made by a polymer having its negative charge temporarily blocked or masked, having a low esterification degree (5 to 20%), together with long EO side chains (5000 Da) and with a masking of the carboxylic acids of 65 to 75 mole % units consisting a methacrylate thereof with total molecular weight of about 50,000.

The component A2 with a polymer having its negative charge temporarily masked, having a low esterification degree (5 to 20%), together with long EO side chains (5000 Da) and with a masking of the carboxylic acids of 25 to 55 mole % units consisting a methacrylate thereof with total molecular weight of about 50,000 was also tested as an alternative to A1. Although A2 can be regarded as a particular structure included in the B1 PCE, it has a narrow range of blocked carboxylic acids.

The dosages for A1, A2 and B1 are given as wt. % of active solid content (ASC) respect to the total aggregates (sand, fine aggregates, coarse aggregates) containing phyllosilicates. The dosage of the system 1 is given as wt. % of active solid content (ASC) respect to the total aggregates containing phyllosilicates. The ratios A1/B1 or A2/B1 are MIX 1 to MIX 3 are three concrete formulations where only the system 2 is used with different dosages (0.25 to 0.36 wt. %) and no workability retention is observed. In MIX2 and MIX3 the flow at 90 minutes was not measured because the concrete was too stiff. In all the cases a difference between the initial flow and the flow obtained at 90 minutes is over 60 mm that is the maximum target defined to have workability retention.

In MIX 4 the system 1 and system 2 are used together with successful results on workability retention. In this case system 1 is composed by 2 components (A1 and B1) with a weight ratio A1/B1=0.31. The system 1 is used with a dosage of 0.04 wt. % of ASC respect to the aggregates.

In MIX 5 only the system 1 is used with an higher dosage (0.08 wt. %) respect to the MIX 4. The same ratio between component A1 and component B1 (A1/B1=0.31) as MIX 4 is used. The workability retention is successful obtained.

In MIX 6, system 1 and system 2 are used together. In that case the dosage of the system 1 (0.04 wt. %) is the same as in MIX 4 but the ratio between the component A1 and B1 inside the system 1 is 0.53. No workability retention is obtained.

Various additional combinations of dosages of system 1 were tested in concrete application, measuring the workability retention of concrete mixed designs with aggregates and sand containing various content of phyllosilicates (0.05% to over 75%), using either the rocks described in table 3 or mixing aggregates or sand from the examples in table 3 with other natural aggregates and sand free of phyllosilicates.

In addition to these tests made with a natural aggregate composed of phyllosilicates other tests were done with an artificial phyllosilicate/clay aggregate composed of an aggregates free from phyllosilicates and clay (limestone aggregates) where a known quantity of phyllosilicates/clay where added or substitute. Additions of illite or montmorillonite or shale composed of muscovite and kaolinite in ranges from 0.05 wt. % to 5 wt. % of the total content of aggregates were tested. The results are presented in table 4.

Consistency of the concrete mixes was measured using the norms EN12350-2 and it was considered that workability retention was obtained when the difference between the initial slump (after 5 min) and the slump obtained at 90 minutes was lower/equal than 50 mm In MIX7 to MIX 10 an increase on phyllosilicates content (from 0.05 wt. % with respect to the total aggregate to

TABLE 4

|  | MIX 7 | MIX 8 | MIX 9 | MIX 10 | MIX 11 | MIX 12 | MIX 13 | MIX 14 |
|---|---|---|---|---|---|---|---|---|
| Aggregate 0/2 mm (Kg/m3) | 733 | 733 | 733 | 733 | 819 | 819 | 783 | 745 |
| Aggregates 4/8 mm (Kg/m3) | 380 | 380 | 380 | 380 | 369 | 369 | 369 | 368 |
| Aggregates 8/16 mm (Kg/m3) | 709 | 709 | 709 | 709 | 638 | 638 | 638 | 637 |
| phillosilicates/clay (% wt respect to the total aggregates) | 0.05 | 0.11 | 0.16 | 0.22 | 1.00 | 1.00 | 3.00 | 5.00 |
| CEM I 52.5N (Kg/m3) | 350 | 350 | 350 | 350 | 350 | 350 | 350 | 350 |
| SYSTEM 1 (% wt ASC respect to aggregates) | 0.07 | 0.08 | 0.08 | 0.08 | 0.08 | 0.08 | 0.08 | 0.10 |
| A2/B1 | 0.82 | 0.82 | 0.82 | 0.82 | — | — | — | — |
| A1/B1 | — | — | — | — | 0.31 | 0.31 | 0.31 | 0.31 |
| SYSTEM 2 (% wt ASC respect to cement) | — | — | — | — | 0.21 | 0.21 | — | — |
| w/b | 0.52 | 0.52 | 0.52 | 0.52 | 0.48 | 0.48 | 0.48 | 0.48 |
| Parameters of fresh concrete |  |  |  |  |  |  |  |  |
| slump (mm) after 5 min | 230 | 240 | 230 | 220 | 220 | 230 | 200 | 200 |
| slump (mm) after 30 min | 240 | 240 | 230 | 200 | 230 | 240 | 230 | 240 |
| slump (mm) after 60 min | 240 | 240 | 230 | 190 | 240 | 240 | 240 | 240 |
| slump (mm) after 90 min | 220 | 230 | 220 | 190 | 240 | 240 | 240 | 240 |
| Density- Kg/m3 | 2378 | 2360 | 2332 | 2344 | 2390 | 2429 | 2349 | 2409 |
| Parameters of hardened concrete |  |  |  |  |  |  |  |  |
| Compressive strength (MPa)- 28 d | 51.42 | 47.54 | 48.26 | 41.09 | — | — | — | — |

In these tests, system 1 was composed by a component A1 made by a polymer that is characterized by a sufficient initial to medium workability PCE having a medium to high esterification degree (30-50%), short EO side-chain (1000 Da) and a copolymer of methacrylic acid backbone and a total molecular weight of 25,000.

The component B1 was made by a polymer having its negative charge temporarily masked, having a low esterification degree (5 to 20%), together with long EO side chains (5000 Da) and with a masking of the carboxylic acids of 65 to 75 mole % units consisting a methacrylate thereof with total molecular weight of about 50,000.

The component A2 was composed by a polymer having its negative charge temporarily masked, having a low esterification degree (5 to 20%), together with long EO side chains (5000 Da) and with a masking of the carboxylic acids of 25 to 55 mole % units consisting a methacrylate thereof with total molecular weight of about 50,000.

The system 1 was used in a dosage from 0.05 wt. % to 0.1 wt. % of ASC respect to the aggregates. The system 2 was used with a dosage of 0.21 wt. % of ASC respect to the cement quantity.

The ratio A2/B1 used was 0.82, while the ratio A1/B1 was 0.31.

0.22%) was tested with a same dosage of the system 1 (0.8% wt of ASC respect to the total aggregate). Good workability retention was observed in all the mixes confirming a good robustness of system 1 to the dosage of the phyllosilicates/clay. This robustness property was observed also in regard to the typology of phyllosilicate/clay used: In MIX 7 to MIX 10 a montmorrillonite clay was used, in the MIX 11 an illite clay was used and in the MIX 12 to MIX 14 a shale composed by muscovite and kaolinite was used.

In MIX 11 to MIX 14 a dosage of phyllosilicate/clay from 1 wt. % to 5 wt. % with respect to the total aggregates (sand, fine aggregate, coarse aggregate) was used. A system with component A1 was used and good workability retention was obtained for all the mixes. Other tests on the basis of MIX 8 changing the ratio A2/B1 have been done and show that if the ratio A2/B1 is more than 1.5 no workability retention was obtained.

Similarly, results for Mixes 15-19 using montmorrillonite clay contents of 0.11 wt % are showed in Table 5 with various ratio of A1/B1 and different dosages of system 1 and system 2.

TABLE 5

|  | MIX 15 | MIX 16 | MIX 17 | MIX 18 | MIX 19 |
|---|---|---|---|---|---|
| Aggregate 0/2 mm (Kg/m$^3$) | 733 | 733 | 733 | 733 | 733 |
| Aggregate 4/8 mm (Kg/m$^3$) | 380 | 380 | 380 | 380 | 380 |
| Aggregate 8/16 mm (Kg/m$^3$) | 709 | 709 | 709 | 709 | 709 |
| phillosilicates/clay (% wt respect to the total aggregates) | 0.11 | 0.11 | 0.11 | 0.11 | 0.11 |
| CEM I 52.5 N (Kg/m$^3$) | 350 | 350 | 350 | 350 | 350 |
| SYSTEM 1 (% wt ASC respect to aggregates) | 0.08 | 0.06 | 0.1 | 0.06 | 0.002 |
| A2/B1 | — | — | — | — | — |
| A1/B1 | 1 | 0.07 | 0.3 | 0.21 | 0.3 |

TABLE 5-continued

|  | MIX 15 | MIX 16 | MIX 17 | MIX 18 | MIX 19 |
| --- | --- | --- | --- | --- | --- |
| SYSTEM 2 (% wt ASC respect to cement) | — | 0.07 | — | 0.02 | 0.37 |
| w/b | 0.52 | 0.52 | 0.52 | 0.52 | 0.52 |
| Parameters of fresh concrete |  |  |  |  |  |
| flow [mm] after 5 min | 240 | 210 | 230 | 210 | 240 |
| flow [mm] after 30 min | 220 | 190 | 230 | 190 | 240 |
| flow [mm] after 60 min | 200 | 200 | 220 | 190 | 230 |
| flow [mm] after 90 min | 190 | 200 | 210 | 180 | 220 |
| Density [Kg/m$^3$] | 2375 | 2347 | 2432 | 2324 | 2280 |
| Parameters of hardened concrete |  |  |  |  |  |
| Compressive strength [Mpa] - 28 d | 41.97 | 46.22 | 44.34 | 42.44 | 43.22 |

Very good workability retention was verified in Mixes 16-19. Mix 15 was produced using only system 1 (0.08 wt. %), with a ratio between A1 and B1 of 1; the difference between initial (after 5 min) and final flows (after 90 min) being equal to 50 mm.

Another Mix using only system 1 was the 17$^{th}$. In this case, the dosage of system 1 was superior to the one used in Mix 15 (0.1 wt. %), A1/B1 being equal to 0.3. The results obtained showed very good workability retention.

Mixes 16, 18 and 19 were comprised of both system 1 and system 2. All mixes showed very good workability retention.

Similarly, results for Mixes 20-25 using montmorrillonite clay contents of 0.11 and 0.22 wt % are showed in Table 6 with various ratio of A2/B1 and different dosages of system 1 and system 2.

TABLE 6

|  | MIX 20 | MIX 21 | MIX 22 | MIX 23 | MIX 24 | MIX 25 |
| --- | --- | --- | --- | --- | --- | --- |
| Aggregate 0/2 mm (Kg/m$^3$) | 733 | 733 | 733 | 733 | 733 | 733 |
| Aggregate 4/8 mm (Kg/m$^3$) | 380 | 380 | 380 | 380 | 380 | 380 |
| Aggregate 8/16 mm (Kg/m$^3$) | 709 | 709 | 709 | 709 | 709 | 709 |
| phillosilicates/clay (% wt respect to the total aggregates) | 0.11 | 0.11 | 0.11 | 0.11 | 0.22 | 0.22 |
| CEM I 52.5 N (Kg/m$^3$) | 350 | 350 | 350 | 350 | 350 | 350 |
| SYSTEM 1 (% wt ASC respect to aggregates) | 0.06 | 0.002 | 0.08 | 0.08 | 0.03 | 0.08 |
| A2/B1 | 0.11 | 0.25 | 0.42 | 0.17 | 1.2 | 0.17 |
| A1/B1 | — | — | — | — | — | — |
| SYSTEM 2 (% wt ASC respect to cement) | — | 0.23 | — | 0.021 | 0.15 | — |
| w/b | 0.52 | 0.52 | 0.52 | 0.52 | 0.52 | 0.52 |
| Parameters of fresh concrete |  |  |  |  |  |  |
| flow [mm] after 5 min | 230 | 220 | 230 | 240 | 220 | 220 |
| flow [mm] after 30 min | 240 | 210 | 220 | 240 | 220 | 200 |
| flow [mm] after 60 min | 240 | 190 | 210 | 240 | 200 | 190 |
| flow [mm] after 90 min | 230 | 180 | 190 | 220 | 190 | 180 |
| Density [Kg/m$^3$] | 2368 | 2342 | 2386 | 2360 | 2300 | 2344 |
| Parameters of hardened concrete |  |  |  |  |  |  |
| Compressive strength [Mpa] - 28 d | 42.24 | 38.10 | 47.50 | 47.54 | 35.27 | 41.09 |

While Mixes 20, 22 and 25 were only composed of system 1, Mixes 21, 23 and 24 had both system 1 and system 2.

Mix 20, with a A2/B1 ratio of 0.11 and a dosage of system 1 of 0.06 wt. % showed perfect workability retention.

All other mixes (Mix 21-25) also showed good workability retention, whether only system 1 was used (dosages between 0.06 wt. % and 0.08 wt. %) or when system 2 was also added (dosages of system 1 in this case between 0.002 wt. % and 0.08 wt. % and system 2 between 0.021 wt. % and 0.23 wt. %).

According to the invention, following are the best combinations and limitations of the various parameters and polymer type with respect to the phyllosilicates contents:

Component A1 0.5 to 50 wt. % system 1
Component A2 0.5 to 55 wt. % system 1
Component B1>=50 wt. % in system 1 containing A1
Component B1>=45 wt. % in system 1 containing A2
Ratio A1/B1 0.05 to 1 (higher values will lead to inefficient effect and lower values didn't allow to have a stability of the mix)
Ratio A2/B1 0.05-1.2 (higher values will lead to inefficient effect and lower values didn't allow to have a stability of the mix)
Dosage range of system 1: 0.002 wt. % to 0.2 wt. %, more preferably to 0.11 wt. %, of ASC with respect to the aggregates containing phyllosilicates (lower content has not effect on aggregates containing phyllosilicates, higher content will give instability to the mix-segregation, retardation, low strength)
Dosage range of system 2: 0.03-0.75 wt. %, more preferably 0.03-0.75 wt. % of ASC respect to the cement (normal dosage range of the plasticizer/superplasticiser in a concrete mix: lower dosage has no effect on the mix, higher dosage give possibility of segregation)

Finally, in another embodiment according to the invention, acceptable workability retention results up to 90 minutes for slump S1-S5 and flow F1-F6 can be obtained in concrete mix designs having a phyllosilicates content from 0.05 to 75 wt. % of the total aggregates (sand, fine and coarse) using only B1 or A1 or A2 type polymer in the system 1.

Hence, one aspect of the invention also concerns a concrete mix design having a slump class from S1 to S5 or a flow class from F1 to F6 and a workability retention between 10 minutes and 120 minutes, comprising from 150 to 600 kg of cement per cubic meter of concrete, aggregates selected from the group consisting of sand, fine aggregates, coarse aggregates or combinations thereof, characterized in that the total content of phyllosilicates of the aggregates is between 0.05 wt. % and 75 wt. %,wherein the concrete mix design includes an admixture system 1 which is based on 100% polycarboxylate ether based copolymer (PCE), the admixture system 1 comprising at least one component B1 being a PCE copolymer
having its negative charge temporarily blocked,
having an esterification degree of between 5%-50%,
with polyoxyalkylene side chains with 750 to 8000 Da,
with a blocking of the carboxylic acids of 45 to 90 mole % units,
the backbone of the PCE B1 consisting of carboxylic acids, salt thereof and dicarboxylic acid, anhydride and/or salts thereof,
the total molecular weight of PCE B1 being located between 10,000 and 1,000,000.
and at least, a second PCE.

Although the invention related to the phyllosilicates wt % content in all aggregates (sand aggregates, fine and coarse aggregates) ranking up to over 75%, the content of clay should not exceed 20 wt % of the total aggregates.

A final advantage of the invention is related to the fact that all admixtures in systems 1 or 2 can added in the normal manufacturing process of concrete (precast, batching, on site batching, truck mixing, etc.) since it does not require any different equipment or pre-processing of the mix components (aggregates, sand aggregate, etc.) and can be dosed in liquids in a very conventional cost effective and practical manner Raw materials considered the admixture systems 1 and 2 are commercially available.

The invention claimed is:

1. A concrete mix design having a slump class from S1 to S5 or a flow class from F1 to F6 and a workability retention between 10 minutes and 120 minutes, comprising:
    from 150 to 600 kg of cement per cubic meter of concrete,
    aggregates selected from the group consisting of sand, fine aggregates, coarse aggregates, and combinations thereof containing between 0.5 wt. % and 75 wt. % of phyllosilicates by weight of total aggregates,
    an admixture system 1 which is based on a 100% polycarboxylate ether based copolymer (PCE), the admixture system 1 comprising at least one component B1 being a PCE copolymer characterized by:
    (i) having its negative charge temporarily blocked,
    (ii) having an esterification degree of between 5%-50%,
    (iii) with polyoxyalkylene side chains with 750 to 8000 Da,
    (iv) with a blocking of the carboxylic acids of 0.1 to 90 mole % units,
    (v) the backbone of the PCE B1 consisting of carboxylic acids, salt thereof and dicarboxylic acid, anhydride and/or salts thereof,
    (vi) the total molecular weight of PCE B1 being in a range between 10,000 and 1,000,000; and
    the admixture system 1 further comprising at least a second PCE different from the at least one component B1.

2. A concrete mix design according to claim 1, wherein the second PCE of the admixture system 1 is a polycarboxylate ether based copolymer (PCE) A1, characterized by:
    (a) an esterification degree of between 5% and 50%,
    (b) polyoxyalkylene side chains with 750 to 8000 Da and
    (c) the backbone of the PCE A1 consisting of carboxylic acids, salt thereof and dicarboxylic acid, anhydride and/or salts thereof; and
    (d) the copolymer A1, having a total molecular weight between 15,000 and 1,000,000 Da.

3. A concrete mix design according to claim 1, wherein the second PCE of the admixture system 1 is a polycarboxylate ether based copolymer (PCE) A2, characterized by:
    (a') an esterification degree of between 5% and 20%,
    (b') polyoxyalkylene side chains with approximately 5000 Da,
    (c') blocking of the carboxylic acids of between 25 to 55 mole % units
    (d') the PCE A2 backbone consisting of methacrylic acids and salts thereof with a total molecular weight of about 50,000 Da; and
    (e') the PCE B1 being characterized by a blocking of its carboxylic acids above 55 mole % units.

4. A concrete mix design according to claim 2, characterized in that the ratio A1/B1 in the admixture system 1 is between 0.05 to 1.

5. A concrete mix design according to claim 3, characterized in that the ratio A2/B1 in the admixture system 1 is between 0.05 to 1.2.

6. A concrete mix design according to any claim 1, further comprising an additional plasticizer forming a second admixture system 2.

7. A concrete mix design according to claim 1, wherein the concrete mix design includes a dosage range of the admixture system 1 of between 0.002 wt. % to 0.2 wt. % of active solid content with respect to the aggregates containing phyllosilicates.

8. A concrete mix design according to claim 7, wherein the concrete mix design includes a dosage range of the admixture system 1 of between 0.002 wt. % to 0.11 wt. % of active solid content with respect to the aggregates containing phyllosilicates.

9. A concrete mix design according to claim 6, wherein the concrete mix design includes a dosage range of the second admixture system 2 of between 0.03-0.75 wt. % of active solid content with respect to the cement.

10. A concrete mix design according to claim 1, wherein the admixture system 1 has a blocking of the carboxylic acids of 20 to 90 mole % units.

11. A concrete mix design according to claim 10, wherein the admixture system 1 has a blocking of the carboxylic acids of 45 to 90 mole % units.

12. A concrete mix design according to claim 6, wherein the second admixture system 2 has a blocking of the carboxylic acids of 20 to 90 mole % units.

13. A concrete mix design according to claim 6, wherein the second admixture system 2 has a blocking of the carboxylic acids of 45 to 90 mole % units.

14. A concrete mix design having a slump class from S1 to S5 or a flow class from F1 to F6 and a workability retention between 10 minutes and 120 minutes, comprising:
    from 150 to 600 kg of cement per cubic meter of concrete,
    aggregates selected from the group consisting of sand, fine aggregates, coarse aggregates or combinations thereof containing between 0.5 wt. % and 75 wt. % of phyllosilicates by weight of total aggregates, a first admixture system 1 which is based on a 100% polycarboxylate ether based copolymer (PCE), the admixture system 1 comprising at least one component B1 being a PCE copolymer characterized by:
  (i) having its negative charge temporarily blocked,
  (ii) having an esterification degree of between 5%-50%,
  (iii) with polyoxyalkylene side chains with 750 to 8000 Da,
  (iv) with a blocking of the carboxylic acids of 0.1 to 90 mole % units,
  (v) the backbone of the PCE B1 consisting of carboxylic acids, salt thereof and dicarboxylic acid, anhydride and/or salts thereof,
  (vi) the total molecular weight of PCE B1 being in a range between 10,000 and 1,000,000; and
the admixture system 1 further comprising at least a second PCE different from the at least one component B1, and
an additional plasticizer forming a second admixture system 2.

15. A concrete mix design according to claim 14, wherein the second PCE of the admixture system 1 is a polycarboxylate ether based copolymer (PCE) A1, characterized by:
  (a) an esterification degree of between 5% and 50%,
  (b) polyoxyalkylene side chains with 750 to 8000 Da and
  (c) the backbone of the PCE A1 consisting of carboxylic acids, salt thereof and dicarboxylic acid, anhydride and/or salts thereof; and
  (d) the copolymer A1, having a total molecular weight between 15,000 and 1,000,000 Da.

16. A concrete mix design according to claim 14, wherein the second PCE of the first admixture system 1 is a polycarboxylate ether based copolymer (PCE) A2, characterized by:
  (a') an esterification degree of between 5% and 20%,
  (b') polyoxyalkylene side chains with approximately 5000 Da,
  (c') blocking of the carboxylic acids of between 25 to 55 mole % units
  (d') the PCE A2 backbone consisting of methacrylic acids and salts thereof with a total molecular weight of about 50,000 Da; and
  (e') the PCE B1 being characterized by a blocking of its carboxylic acids above 55 mole % units.

17. A concrete mix design according to claim 15, characterized in that the ratio A1/B1 in the admixture system 1 is between 0.05 to 1.

18. A concrete mix design according to claim 16, characterized in that the ratio A2/B1 in the admixture system 1 is between 0.05 to 1.2.

19. A concrete mix design according to claim 14, wherein the concrete mix design includes a dosage range of the admixture system 1 of between 0.002 wt. % to 0.2 wt. % of active solid content with respect to the aggregates containing phyllosilicates and a dosage range of the second admixture system 2 of between 0.03-0.75 wt. % of active solid content with respect to the cement.

20. A concrete mix design according to claim 14, wherein at least one of the admixture system 1 or the admixture system 2 has a blocking of the carboxylic acids of 20 to 90 mole % units.

* * * * *

UNITED STATES PATENT AND TRADEMARK OFFICE
CERTIFICATE OF CORRECTION

PATENT NO.       : 9,688,579 B2
APPLICATION NO.  : 14/909025
DATED            : June 27, 2017
INVENTOR(S)      : Rinnhofer et al.

It is certified that error appears in the above-identified patent and that said Letters Patent is hereby corrected as shown below:

In the Specification

Column 1
Line 14, change "composition" to --compositions--
Line 19, change "composition" to --compositions--
Line 22, change "as well a various" to --as well as various--
Lines 36-37, change "in term of" to --in terms of--
Line 42, change "slate may phyllosilicates" to --slate, many phyllosilicates--
Line 59, change "information are available" to --information is available--

Column 2
Lines 8-9, change "this enabling transportation" to --thus enabling transportation--
Line 37, change "state" to --states--
Line 41, change "relates to a an" to --relates to an--

Column 3
Line 29, change "In further" to --In a further--
Line 63, change "In another embodiment" to --Another embodiment--

Column 4
Lines 18-19, change "admixtures formulation to" to --admixtures formulated to--
Line 20, change "mix designed" to --mix designs--
Line 39, change "contribute to the reaching" to --contribute to reaching--
Line 55, change "bring" to --brings--

Column 5
Line 10, change "silica in—both, amorphous" to --silica in both amorphous--
Line 19, insert --.-- after "chemical polymer"
Line 21, change "state" to --states--
Line 31, change "admixtures" to --admixture--

Signed and Sealed this
Second Day of January, 2018

Joseph Matal
*Performing the Functions and Duties of the
Under Secretary of Commerce for Intellectual Property and
Director of the United States Patent and Trademark Office*

Lines 48, change "material is consider as pourable" to --material is considered pourable--
Line 52, change "use" to --used--
Line 53, change "construction element or structure. It includes concrete" to --construction elements or structures and include concrete--
Line 55, change "consider" to --considered--
Line 57, insert --.-- after "25 MPa"
Line 58, change "measure" to --measured--
Line 59, insert --.-- after "slump)"
Line 62, change "depend" to --depends--
Line 64, change "start when the construction material change" to --starts when the construction material changes--
Line 67, insert --.-- after "the material"

Column 6
Line 3, insert --.-- after "32 mm"
Line 6, insert --.-- after "8 mm"
Line 8, insert --.-- after "4 mm"
Line 10, change "mainly by clay" to --mainly of clay--
Line 11, insert --.-- after "with water"
Lines 65-66, change "additive" to --additives--

Column 7
Line 50, change "consisting a" to --consisting of a--
Line 57, change "consisting a" to --consisting of a--
Line 63 and after, change all instances of "content (ASC) respect" to --content (ASC) with respect--

Column 8
Line 11 and after, change all instances of "ASC respect" to --ASC with respect--
Line 50, change "(0.08 wt. %) respect" to --(0.08 wt. %) with respect--
Line 52, change "successful" to --successfully--

Column 9
Line 2, change "aggregates" to --aggregate--
Line 4, change "where added or substitute" to --was added or substituted--
Line 31 and after, change all instances of "composed by a" to --composed of a--
Line 41 and after, change all instances of "consisting a" to --consisting of a--

Column 10
Line 52, change "showed" to --shown--
Line 53, change "ratio" to --ratios--

Column 11
Line 28, change "showed" to --shown--
Line 29, change "ratio" to --ratios--
Line 67, change "type" to --types--

Column 12
Line 30, change "has not effect" to --has no effect--

Column 13
Line 30, change "can added" to --can be added--
Line 37, change "considered the admixture" to --considered for the admixture--